No. 12,007.
Reissued July 1, 1902.
C. E. SCRIBNER.
SUPERVISORY SIGNAL FOR TELEPHONE SWITCHBOARDS.
(Application filed Feb. 25, 1901.)
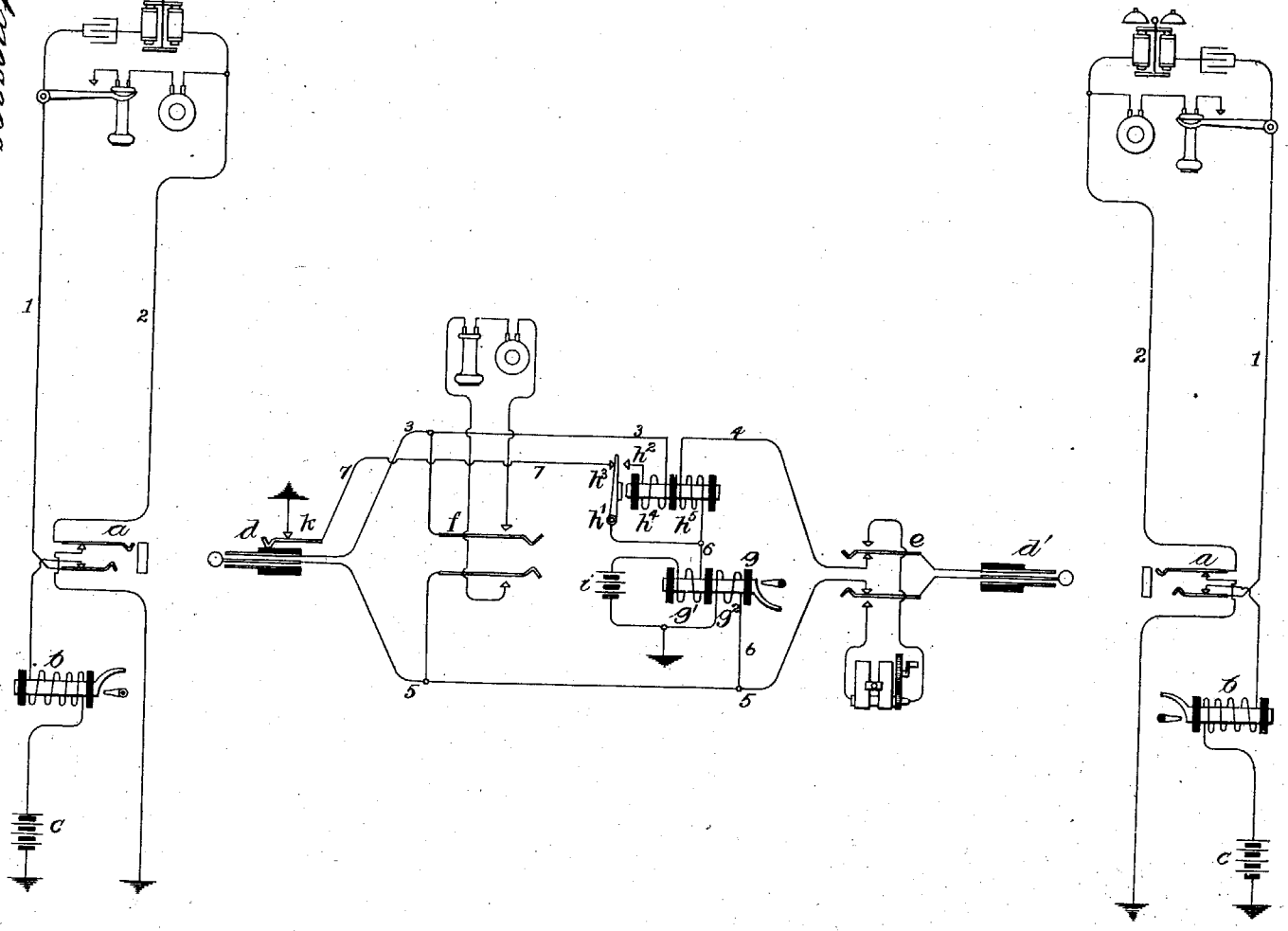
Witnesses
J. W. Skinkle.
H. W. Leach.
Inventor:
Charles E. Scribner,
By Henry P. Barton
Attorney.
THE NORRIS PETERS CO., PHOTO-LITHO., WASHINGTON, D. C.

UNITED STATES PATENT OFFICE.

CHARLES E. SCRIBNER, OF CHICAGO, ILLINOIS, ASSIGNOR TO THE WESTERN ELECTRIC COMPANY, OF CHICAGO, ILLINOIS, A CORPORATION OF ILLINOIS.

SUPERVISORY SIGNAL FOR TELEPHONE-SWITCHBOARDS.

SPECIFICATION forming part of Reissued Letters Patent No. 12,007, dated July 1, 1902.

Original No. 638,426, dated December 5, 1899. Application for reissue filed February 25, 1901. Serial No. 48,863.

*To all whom it may concern:*

Be it known that I, CHARLES E. SCRIBNER, a citizen of the United States, residing at Chicago, in the county of Cook and State of Illinois, have invented a certain new and useful Improvement in Supervisory Signals for Telephone-Switchboards, (Case No. 456,) of which the following is a full, clear, concise, and exact description.

This invention concerns supervisory signals for association with united telephone-lines to indicate to the attendant the condition of the telephonic appliances at the substations of the lines, the object of the invention being to provide a means of controlling the supervisory signal in such a way that it may act in response to only those acts of the subscribers which are of interest to the operator in the performance of her duties.

In establishing and supervising a connection between telephone-lines an operator after making connection with the calling-line and receiving the order for the required connection requires information thereafter only of the response of the called party to the call and finally of the replacement of the telephones on their supports at both stations when conversation is finished.

It has been common in telephone-switchboards of modern type to provide, in connection with united telephone-lines, a source of current, a switch at each substation for controlling current in the line, and one or more supervisory signals associated with both or with each of the lines and responsive to such currents. In following some modes of supervising a single supervisory signal has been provided in a bridge of the plug-circuit or link connector uniting the lines. This plan has been unsatisfactory in that it imparted to the operator no information as to the response of the called party. In other switchboards a supervisory signal has been provided in connection with each line, each signal responding only to current in its own line; but this plan is inefficient in that it requires the operator to observe two signals in order to ascertain the call for disconnection and that it permits either of the two signals to be displayed at intervals during the connection, when its indication is of no assistance to the operator and serves merely to distract her attention.

My invention applies to signaling systems of this general type and aims to permit the display of a supervisory signal associated with the called line until the called party responds and thereafter to again permit its display only to indicate a call for disconnection in accordance with the replacement of both telephones on their switches at the substations.

To this end it consists, in the combination with united lines or with link conductors for temporarily uniting lines, of a supervisory signal designed to come into a bridge of the line, together with a source of current, an electromagnet having a winding in each line, and switch-contacts controlled by the magnet adapted to connect the supervisory signal with the line of the called party when inert and to connect it with both lines when excited, whereby the supervisory signal indicates a current in the line of the called party when the telephone at the called station is removed from its switch for use, but thereafter is controlled by current in both lines and serves to indicate only the cessation of current in both.

The invention further consists in means for maintaining the hidden condition of the signal while the plugs or link conductors are not in use.

The invention is described in connection with the attached drawing. The figure represents two telephone-lines terminating in the usual calling and connecting appliances in a telephone-switchboard and a pair of plugs with their link conductors or plug-circuit for uniting the lines, the latter appliances being provided with a supervisory signal in accordance with the invention. The stations of the telephone-lines are equipped with the usual signal-bell, telephone, and switch, the circuits being adapted for the production of a closed circuit through the telephones when the receiver is taken for use. The line conductors 1 and 2 from the station apparatus are led to a spring-jack *a* in the telephone-switchboard and by normally closed extensions therefrom through an individual or line-signal $b$ to a source of current $c$. The line-signal $b$ will then be displayed to the operator to indicate a call when the telephone at the substation of the corresponding line is removed from its switch through the agency of current flowing from the source $c$ through the closed circuit at the substation. The switchboard is furnished with a number of pairs of plugs $d$ $d'$ with their associated appliances. One pair only is here shown. These plugs form the terminals of a plug-circuit, which while the lines are in use forms a continuous conducting-circuit between the lines. With the plug-circuit are associated the usual calling-key $e$ for connecting a generator of signaling-current with the plug $d'$, which is designed for use in connecting to lines called for and with a listening-key $f$ for bringing the operator's telephone into connection with the plug-circuit.

In accordance with this invention a supervisory signal $g$ is associated with each pair of plugs or plug-circuit. The circuit connections of this signal with the plug-circuit are controlled by a relay $h$, provided with an armature-lever $h'$, playing between two contact-anvils $h^2$ and $h^3$. This relay has two windings $h^4$ and $h^5$. The former of these windings is connected in a conductor 3, leading from the front contact $h^2$ of the relay to the sleeve of the answering-plug $d$, while the latter winding $h^5$ is connected in a conductor 4, leading from the switch-lever $h'$ to the sleeve-contact of calling-plug $d'$. The tip-contact pieces of the plugs are united by a continuous conductor 5. The supervisory signal $g$ is provided with two windings, which are included serially in a conductor 6, which forms a bridge of the plug-circuit, uniting conductors 4 and 5 thereof. A source of current $i$ is interposed in the bridge-conductor between the windings of the signal $g$. These windings should of course be of high impedance in order that the shunting of telephonic current through the bridge may be prevented. One of the plugs, preferably the answering-plug $d$, rests in a seat provided with a plug-seat switch $k$, which is designed to close a circuit while the plug is in its seat. This switch controls the continuity of a conductor 7, terminating at one extremity in the contact-point $h^3$ of relay $h$ and connecting at its other extremity with that pole of battery $i$ which is connected with conductor 6 of the plug-circuit or otherwise in any suitable way to bring the battery into a local circuit, including one or both windings of the supervisory signal when the contacts $h'$ $h^3$ are closed, the connection being shown as extending to earth. While the apparatus of the switchboard is idle the magnet $h$ is inert and a local circuit is formed from battery $i$ through one winding $g'$ of the supervisory signal, through wire 6, through the contacts $h'$ $h^3$, and through wire 7, the contacts of plug-seat switch $k$ being closed. The magnet of signal $g$ is thus excited, and the indicator of the signal which is designed to appear when the magnet is inert is hidden. An operator on observing a call-signal displayed in one of the line-indicators follows the usual steps of inserting answering-plug $d$ into the spring-jack of the calling-line, obtaining the subscriber's order for connection with another line, inserting calling-plug $d'$ into a spring-jack of the line called for, and operating the ringing-key $e$ to ring the bell at the station thereof. Inasmuch as these operations are familiar to those skilled in the art of telephony, I do not pause to trace them in detail. When the plug $d$ is raised from its seat, the plug-seat switch $k$ breaks the conductor 7, interrupting the current in the local circuit and the indicator of supervisory signal $g$ comes into view. When the plug $d'$ is connected with the line called for, the circuit through signal $g$ remains broken, being open at the telephone-switch at the substation until the called party, responding to the call, takes the telephone for use. Then the telephone-switch at the substation closes circuit between line conductors 1 and 2, thereby completing a circuit through the supervisory signal and the relay $h$, which may be traced as follows: from battery $i$, through a portion of conductor 6, including a winding of the supervisory signal, thence through conductor 4 of the plug-circuit, including the winding $h^5$ of relay $h$, to line conductor 2, returning by line conductor 1 and finding circuit to battery $i$ through a portion of conductor 5 and wire 6, including the other winding of supervisory signal $g$. The signal thus becomes excited, and its indicator is concealed. This signifies to the operator that the party called for has responded to the call. At the same time magnet $h$ becomes actuated, being excited by current flowing in the winding $h^5$, and brings its armature-lever $h'$ into contact with the anvil $h^2$. This movement of the armature thus unites conductors 3 and 4, forming a continuous conductor between the sleeves of the plugs and between the two line conductors 1 of the lines to be united. Thereafter current flows from the bridge 6 to both the called and the calling lines. The magnet will therefore remain excited as long as the telephone at either station is in use. The current traversing the windings of the supervisory signal $g$ is also rendered independent of the condition of the apparatus at either station alone, so that the magnet will remain excited and the signal will remain hidden as long as either telephone is off its switch. When at the termination of conversation the users of the telephones at both stations replace their receiving instruments on the telephone-switches, current through the windings of the supervisory signal $g$ and of the relay-magnet $h$ is interrupted and the magnets of both become inert. The supervisory signal then displays its indicator, and this second display of the indicator shows the operator that the use of the line is finished. She therefore removes the plugs $d$ and $d'$ from the spring-jacks into which they are inserted and places them in their resting-seats. The replacement of plug $d$ in its seat causes the switch $k$ to close the break in wire 7, and inasmuch as the armature has come to rest on its contact $h^3$ completes the circuit through the supervisory signal and effects the concealment of its indicator. Thus the indicators of all signals associated with plugs which are not in use are hidden. The display of an indicator immediately after the establishment of connection with a line indicates that no response has been made to the call sent. The signal is hidden when the called party takes the telephone for use, and the signal is thereafter displayed only when at the termination of the use of the line both telephones are returned to their supports. This invention thus avoids all confusion of signals and eliminates all indications on the part of the signals, excepting those which are found in practice to be essential to the proper establishment and supervision of the connection.

The invention is defined in the following claims:

1. The combination with united telephone-lines each provided at its station with means for determining the flow of current in the line in the use of the telephone, a bridge of the united lines and a supervisory signal and a source of current included therein, of a relay with two windings, one included in the line to each station between said station and the bridge, the switch-contacts of the said relay being adapted to break the circuit of the lines between the bridge and the calling-station when the magnet is inert; whereby the supervisory signal is rendered responsive to current in both telephone-lines, substantially as and for the purpose set forth.

2. The combination with telephone-lines each provided with means at its station for determining the flow of current in the line in the use of the telephone, and link conductors uniting the lines, of a bridge between said link conductors, and a supervisory signal and a source of current included therein, a calling-key in said link conductors adapted to connect a source of calling-current with one of said lines, a relay having two windings one being placed in a link conductor toward each station, between the station and said bridge, the switch-contacts of said relay being open when the relay is inert, said switch-contacts being interposed in the link conductor between the said bridge and the calling-station, as described.

3. The combination with two telephone-lines each provided at its station with a switch for determining the flow of current in the line during the use of the telephone, of a bridge of the circuit, a supervisory signal and a source of current in the bridge, a magnet-winding in a line conductor to each station between said station and the bridge, a normal break of the line-circuit between the bridge and the calling-station, and switch-contacts actuated by said magnet-windings adapted to close the break when the winding in circuit with the called station is excited, as described.

4. In combination, a telephone-line provided at its station with means for determining the flow of current in the line during the use of the telephone, a pair of plugs and the plug-circuit thereof for making connection with the line, a bridge of the plug-circuit, a supervisory signal and a source of current in the bridge, a magnet with two windings, one of said windings being in the conductor leading from said bridge to each station, switch-contacts controlled by the said windings, one pair of said contacts adapted to be closed when the magnet is excited being interposed in a conductor of the plug-circuit between said bridge and one of the stations, and other switch-contacts adapted to be closed when the magnet is inert controlling a local circuit including a winding of the supervisory signal together with a source of current, as described.

5. In combination with telephone-lines, each provided with a switch at its station for determining the flow of current in the line during the use of the telephone, a pair of plugs and the plug-circuit thereof for making connection between lines, a bridge of the plug-circuit, and a supervisory signal and source of current therein, a relay-magnet with two windings, one of said windings being included in the plug-circuit at each side of the bridge, switch-contacts of the relay adapted to be closed when the relay is excited interposed in the conductor of the plug-circuit with one of said magnet-windings, other switch-contacts of the relay adapted to be closed when the magnet is inert, a local circuit of the supervisory signal including a source of current controlled by said last-mentioned switch-contacts of the relay, and a plug-seat switch for one of the plugs adapted to open the said local circuit when the plug is removed from its socket, substantially as described.

In witness whereof I hereunto subscribe my name this 4th day of February, A. D. 1901.

CHARLES E. SCRIBNER.

Witnesses:
ELLA EDLER,
DEWITT C. TANNER.